United States Patent

Buckley et al.

[11] Patent Number: 6,085,523
[45] Date of Patent: *Jul. 11, 2000

[54] MASTER CYLINDER PISTON ADJUSTMENT

[75] Inventors: James A. Buckley, Whitefish Bay; James J. Dimsey, Brown Deer, both of Wis.

[73] Assignee: Hayes Brake, Inc., Mequon, Wis.

[*] Notice: This patent is subject to a terminal disclaimer.

[21] Appl. No.: 09/103,296

[22] Filed: Jun. 23, 1998

Related U.S. Application Data

[63] Continuation of application No. 09/021,337, Feb. 10, 1998.

[51] Int. Cl.[7] .............................. G60T 11/26; F15B 7/08; F15B 7/00

[52] U.S. Cl. .............................................. 60/585; 60/533

[58] Field of Search .......................... 60/583, 585, 535; 188/72.5, 151 R, 72.4, 152, 358, 359

[56] References Cited

U.S. PATENT DOCUMENTS

| | | | |
|---|---|---|---|
| 3,064,432 | 11/1962 | Shutt | 60/562 |
| 3,186,174 | 6/1965 | Hayman | 60/578 |
| 3,621,945 | 11/1971 | Spry | 188/71.5 |
| 3,792,433 | 2/1974 | Wada | 188/1.11 R |
| 4,093,043 | 6/1978 | Smith | 188/73.46 |
| 4,445,334 | 5/1984 | Derrick | 60/585 |
| 4,913,267 | 4/1990 | Campbell et al. | 188/218 XL |
| 4,941,323 | 7/1990 | Leigh-Monstevens | 60/589 |
| 5,038,895 | 8/1991 | Evans | 188/72.7 |
| 5,251,446 | 10/1993 | Mori et al. | 60/533 |
| 5,529,150 | 6/1996 | Buckley et al. | 188/72.9 |

FOREIGN PATENT DOCUMENTS

| | | |
|---|---|---|
| 0 214 373 | 3/1987 | European Pat. Off. . |
| 1 366 446 | 9/1974 | United Kingdom . |
| 2 017 236 | 10/1979 | United Kingdom . |
| 2 056 601 | 3/1981 | United Kingdom . |

*Primary Examiner*—Matthew C. Graham
*Assistant Examiner*—Bradley King
*Attorney, Agent, or Firm*—Foley & Lardner

[57] ABSTRACT

An improved braking system includes a valving arrangement which permits reduction of deadband regardless of a randomly selectable piston home position or permits adjustment of the deadband. The system includes a fluid reservoir, a piston located in a cylinder including a reservoir port, a first fluid channel connecting the reservoir to the reservoir port, a brake actuator, and a second fluid channel connecting the cylinder to the brake actuator. The piston is moveable within the cylinder to produce fluid flow within the first channel. A first valve is disposed between the reservoir and the cylinder to prevent fluid flow from the cylinder to the reservoir when the piston is moved to pressurize fluid in the second fluid channel.

29 Claims, 5 Drawing Sheets

MASTER CYLINDER PISTON ADJUSTMENT

CROSS REFERENCE TO RELATED APPLICATIONS

The present patent application is a continuation of U.S. patent application Ser. No. 09/021,337 filed on Feb. 10, 1998.

FIELD OF THE INVENTION

The present invention relates to a braking system for a vehicle. In particular, the present invention provides improved valving and fluid communication between the fluid reservoir, hydraulic cylinder and brake actuator of a braking system. This improved arrangement permits adjustment of the range of piston travel in the cylinder prior to the generation of fluid pressure sufficient to initiate braking.

BACKGROUND OF THE INVENTION

A typical braking system for a vehicle includes a master cylinder and a hydraulic fluid reservoir which supplies fluid or accepts fluid from the cylinder depending upon fluid conditions (e.g. brake piston movement due to pad wear, fluid cooling, fluid heating, fluid leakage). The master cylinder and reservoir include a fluid conduit coupled therebetween such that fluid only flows between the cylinder and reservoir when the cylinder's piston is within a predetermined range of motion (e.g. 5–10%) at the beginning of the piston's stroke. More specifically, the conduit connecting the cylinder and reservoir of a typical system is connected to a cylinder port which opens to the inside of the cylinder along the predetermined range of motion of the piston at the beginning of its stroke. Accordingly, until the piston moves far enough to cover the port, fluid can flow from the cylinder to the reservoir and thus the fluid is not pressurized sufficiently to cause the brake actuator to generate the forces required for braking.

The conventional cylinder and reservoir arrangement described above typically requires precision tolerances on the placement of the cylinder port with respect to the piston backstop which defines the beginning of the piston stroke. Additionally, this arrangement requires that the piston and cylinder be fabricated with substantial precision. Furthermore, the range of piston motion between the edge of the piston seal and the cylinder port must be large enough to accommodate rubber swelling which occurs over time. As discussed above, the range of piston motion typically required before the piston seal covers and closes the cylinder port is about 5–10% of the piston's stroke. Accordingly, valuable fluid displacement (i.e. fluid displacement pressurized sufficiently to cause the brake actuator to generate forces required for braking) is wasted during the piston movement before the cylinder port is covered.

In addition to having lost motion before valuable fluid displacement, conventional cylinder and reservoir arrangements require that the piston be returned to the beginning of its stroke to permit fluid flow between the cylinder and reservoir. More specifically, the piston must be moved such that the cylinder port is uncovered before fluid can flow between the cylinder and reservoir.

In view of the drawbacks of conventional master cylinder and fluid reservoir arrangements, it would be desirable to provide an improved arrangement which reduces or eliminates wasted piston motion during braking. It would also be desirable to provide an arrangement which permits fluid flow between the cylinder and reservoir after braking force is removed from the piston regardless of the home position of the piston. It would further be desirable to provide an arrangement which permits adjustment of the length of piston travel prior to braking.

SUMMARY OF THE INVENTION

The present invention provides a hydraulic fluid pressurization system configured to be normally vented to atmosphere and to close rapidly regardless of piston home position. The system includes a fluid reservoir and a housing defining a cylinder including a first end and a second end. The housing includes a reservoir port located generally at the second end of the cylinder in fluid communication with the reservoir. The system also includes a piston moveable within the cylinder between the first and second ends. A valve is disposed between the reservoir and the cylinder to prevent fluid flow from the cylinder to the reservoir when the piston is moved to pressurize fluid in the cylinder. The valve can be coupled to the piston to move relative to the reservoir port in response to movement of the piston.

The present invention also provides a braking system with a controllable dead zone. The braking system includes a fluid reservoir, a cylinder having a reservoir port, and a piston disposed in the cylinder. The piston is located at a selectable first position when the system is not braking. The system also includes a rod connected to the piston to actuate the braking system when force is applied to the rod, a spring for returning the piston to the selectable first position when force is removed from the rod, a first fluid channel connecting the reservoir to the reservoir port, a brake actuator, and a second fluid channel connecting the cylinder to the brake actuator. The piston is moveable within the cylinder to produce fluid flow in the first channel, and a valve is disposed between the reservoir and the cylinder to prevent fluid flow from the cylinder to the reservoir when the piston is moved to pressurize fluid in the second fluid channel. The valve may be constrained by a shoulder on the rod. The valve is braced against the shoulder to close the first valve when the rod is moved to a predetermined second position, and the distance between the first position and the selectable second position provides the dead zone.

The present invention further provides a braking system including a source of brake fluid, a cylinder connected to the source of brake fluid, a piston disposed in the cylinder, and a rod connected to the piston to move the piston and including a shoulder. A brake actuator is connected to the cylinder to receive brake fluid from the cylinder and return brake fluid to the cylinder. The system also includes a spring for returning the piston to a first predetermined position, and a valve for closing a connection between the cylinder and the source of brake fluid and for preventing return of brake fluid to the cylinder from the brake actuator to the cylinder. The valve is braced against the shoulder to move the valve into a closed position when the rod is moved and to maintain a force on the valve when the piston is moved a predetermined distance.

BRIEF DESCRIPTION OF THE DRAWINGS

The preferred exemplary embodiment of the invention will hereinafter be described in conjunction with the appended drawings, wherein like numerals denote like elements.

DETAILED DESCRIPTION OF THE PREFERRED EMBODIMENT

Figure 1:
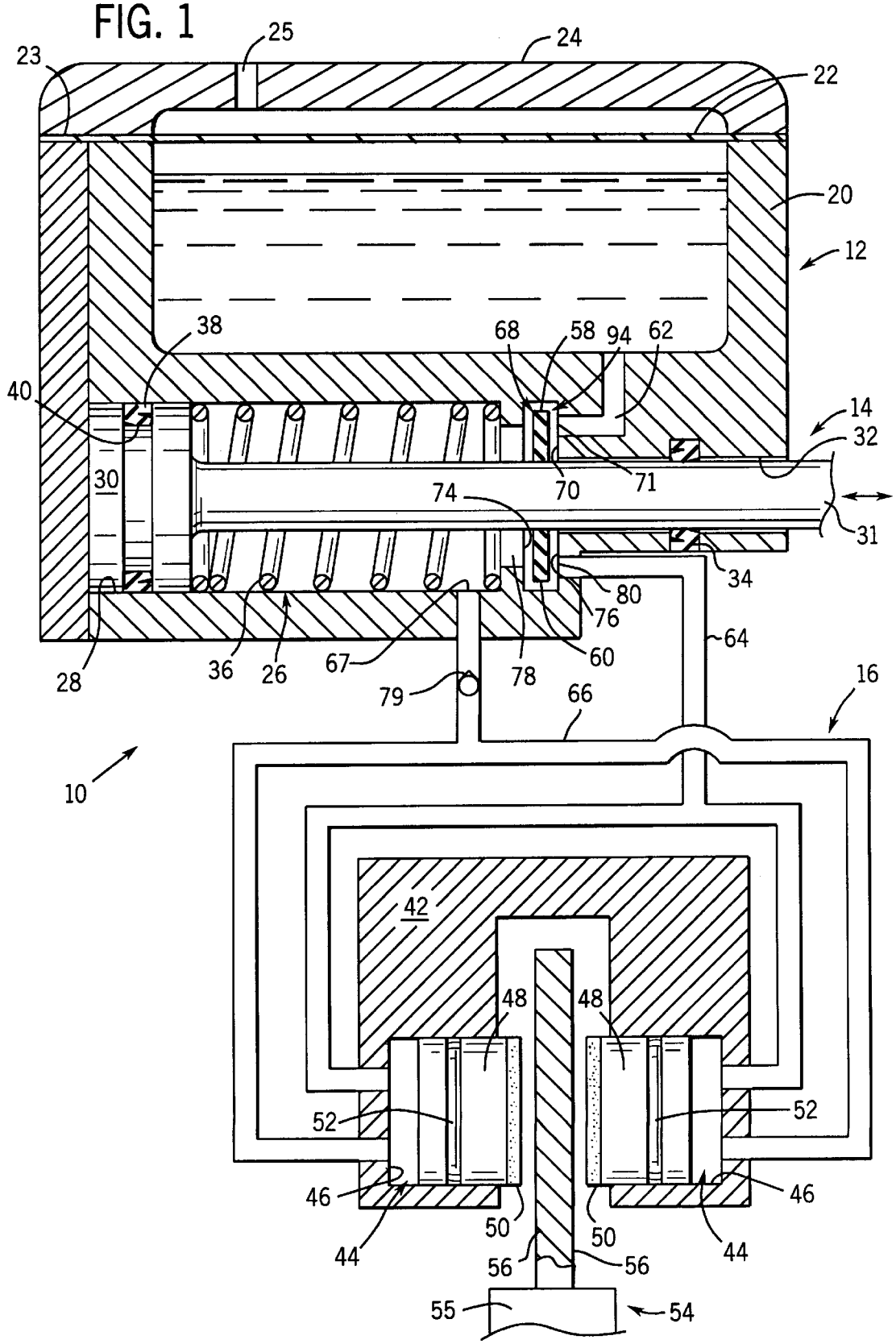
FIG. 1 is a schematic representation of the preferred exemplary embodiment of a braking arrangement in accordance with the present invention.

Referring to FIG. 1, the braking system 10 includes a fluid source 12, a fluid pressurization section 14, a brake actuator 16 and a braking element 54. The fluid source 12 includes a fluid vessel 20 (e.g. rectangular cup, circular cup, oval cup, etc.), a sealed rolling diaphragm 22 or bellows (e.g. elastomeric membrane), and a cover 24 including one or more venting holes 25. Cover 24 is typically fastened to vessel 20 to capture a peripheral edge 23 of diaphragm 22. Depending upon the application, cover 24 may be attached to vessel 20 with screws (not shown) or other appropriate fastening arrangement such as a hinge and latch arrangement.

Figure 2:
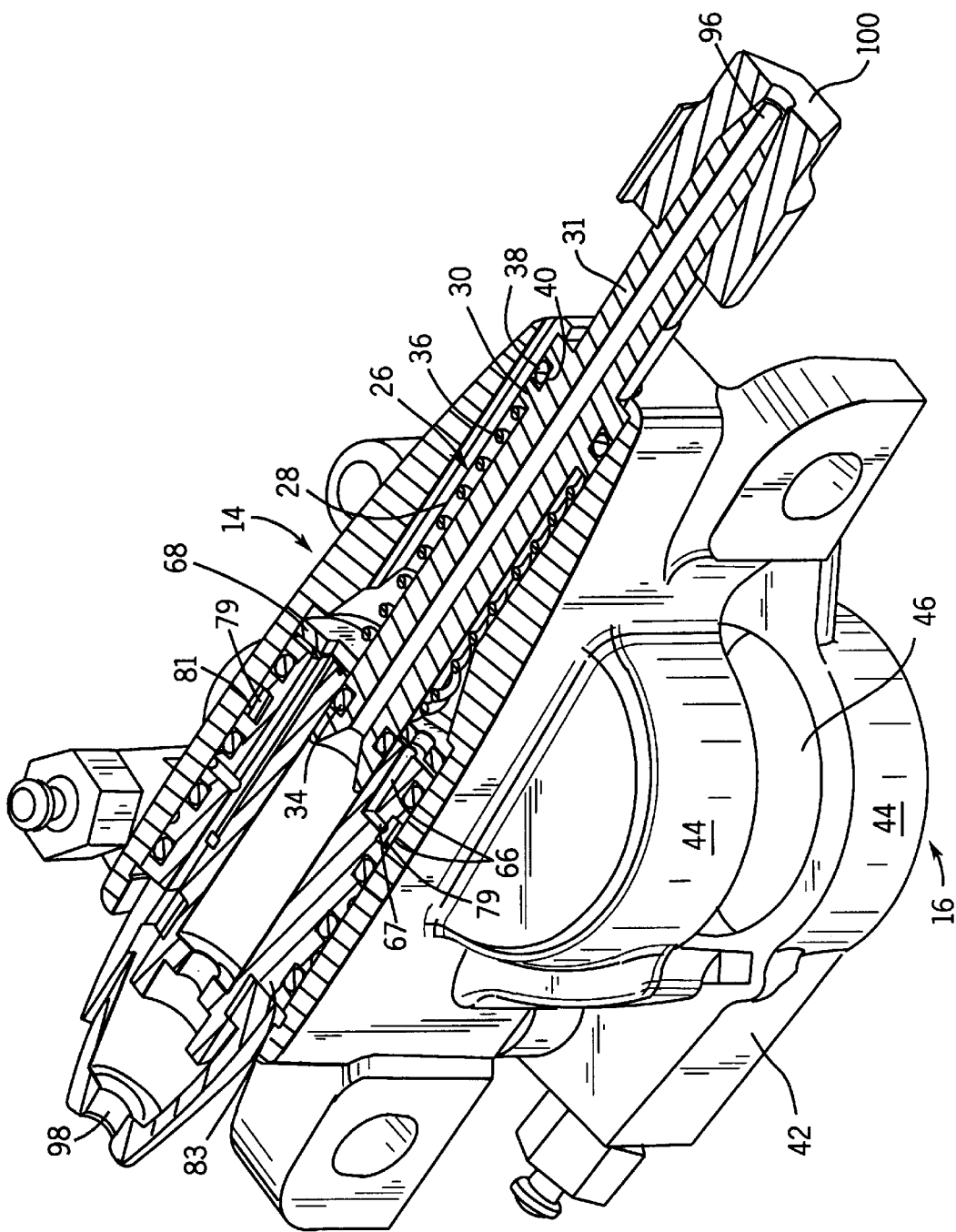
FIG. 2 illustrates an example of a one-piece configuration for a braking arrangement.
Figure 4:
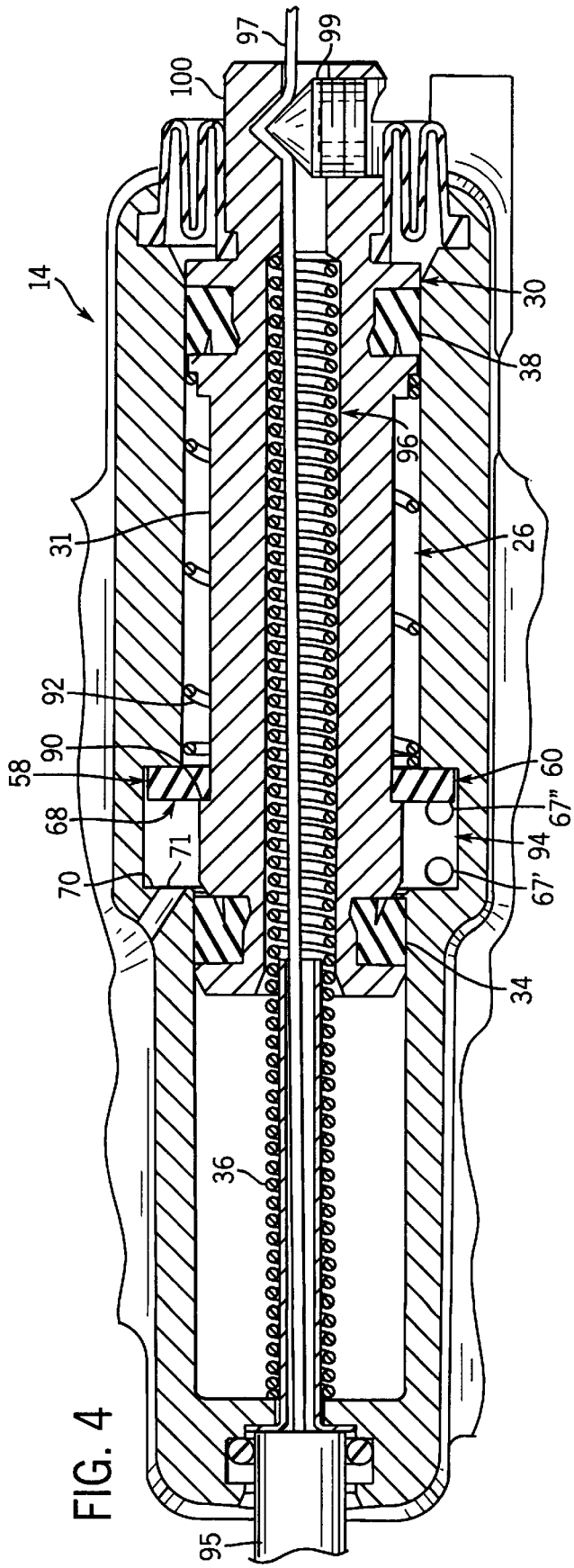
FIG. 4 is a partially schematic representation of another embodiment of the fluid pressurization section for the braking system.

Fluid pressurization section 14 includes a cylinder 26 defined by a cylinder wall 28, a piston 30 including a piston rod 31, a piston rod guide including a guide wall 32 and a seal 34, and a piston return spring 36. Piston 30 and rod 31 can be fabricated as separate elements which are joined with an appropriate junction such as welding, a thread and screw arrangement, or press fitting rod 31 in a hole in piston 30. Alternatively, piston 30 and rod 31 can be fabricated (e.g. machined, casted, molded, etc.) from a single piece of material. Depending upon the application and materials used for piston 30 and cylinder wall 28, one or more seals 38 (only one shown) may be located in a seal groove 40 in piston 30 to provide an appropriate sliding seal between piston 30 and cylinder wall 28. By way of further alternative, seal 34 may also move with rod 31 (as shown in FIGS. 2 and 4).

By way of example only, vessel 20 may be fabricated from metal or plastic, diaphragm 22 may be fabricated from an elastomer, vessel 20 may be fabricated from metal or plastic, cylinder wall 28 may be fabricated from metal or plastic, piston 30 may be fabricated from metal or plastic, piston rod 31 may be fabricated from metal or plastic, seal 34 may be fabricated from elastomer, and seal 38 may be fabricated from elastomer.

Brake actuator 16 may be of the type for use with drum or disk brakes. The embodiment of actuator 16 disclosed herein is for use in a disk brake braking system. Actuator 16 includes a housing or frame 42, and a pair of opposed brake pad guides or cylinders 44 which are defined by cylinder walls 46. Actuator 16 also includes a pair of pistons 48, each disposed within a cylinder 44. Each piston 48 includes a brake pad 50 which may or may not be attached thereto depending upon the application. Depending upon the application and materials used for pistons 48 and cylinder walls 46, one or more seals 52 (only one shown) may be located in seal grooves in pistons 48 to provide an appropriate sliding seal between pistons 48 and the respective cylinder walls 46.

In operation as described in further detail below, when brake fluid in cylinders 44 is pressurized, pistons 48 move toward each other and toward a brake rotor 54 disposed therebetween. Brake rotor 54 is appropriately attached to a wheel hub 55 (or axle) of a vehicle such as a bike, motorcycle, car or truck. After sufficient movement, pistons 48 force their respective brake pads 50 against braking surfaces 56 of rotor 54 to resist and/or stop rotation of rotor 54.

Brake actuator 16 has been described as having a pair of pistons 48 and associated brake pads 50. However, actuator 16 could be of the type with a single piston 48 and associated pad 50. With this configuration, the second pad is stationary and the actuator is mounted to the associated vehicle to permit frame 42 to move such that the one piston 48 generates the motion required to force both pads 50 against rotor 54 to generate a braking force.

By way of example only, frame 42 may be fabricated from metal, cylinder walls 46 may be fabricated from metal, pistons 48 may be fabricated from metal or plastic, brake pads 50 may be fabricated from compound materials, seals 52 may be fabricated from elastomers, and rotor 54 may be fabricated from metal or any other material appropriate for the application.

Turning now to the valving and fluid flow arrangements for braking system 10 as illustrated in FIG. 1, the valving includes a reservoir valve seal portion 58 and a fluid return valve seal portion 60 located in a cylindrical cavity 94. Depending upon the application, valve seals 58 and 60 may be formed as part of a single seal unit, or individually. The fluid flow arrangement includes a fluid channel or conduit 62 extending from fluid vessel 20 to cylinder 26, a fluid supply channel or conduit 66 extending from cylinder 26 to cylinders 44, and a fluid return channel or conduit 64 extending from cylinders 44 to cylinders 26. Conduits 62, 64 and 66 can be formed from appropriate tubing, or can be formed directly in the housings for the components of system 10 as described in further detail below in reference to FIG. 2.

Reservoir valve portion 58 is illustrated in FIG. 1 as comprising a portion of a diaphragm type valve 68. Valve 68 is in the shape of an annulus which extends around rod 31 and preferably has a slight interference fit therewith. Valve portion 58 is located between vessel 20 and cylinder 26 adjacent a valve seat 70 and a reservoir port 71 of conduit 62.

During movement of piston 30 to pressurize fluid applied to actuator 16, the fluid pressure in cylinder 26 becomes greater than the pressure in vessel 20 (which is typically at atmospheric pressure), and thus valve portion 58 is forced against seat 70. More specifically, fluid flow into channel 62 causes valve portion 58 to be forced against valve seat 70, which closes reservoir port 71 to channel 62 and prevents fluid flow from cylinder 26 back to vessel 20 during brake actuation. The pressure differential across valve portion 58 maintains it against port 71 when the pressure in cylinder 26 is above the pressure in vessel 20 (e.g., atmospheric pressure). However, when actuation of piston 30 is terminated and piston 30 is returned to its unactuated position by spring 36, valve portion 58 moves away from port 71 when the pressure differential between the fluid in cylinder 26 and vessel 20 drops to within a predetermined range (e.g. 20 psi). Fluid is then permitted to pass around valve portion 58 to or from vessel 20 depending upon the fluid volume excess or deficiency in cylinder 26.

Fluid return valve portion 60 comprises the other portion of annular diaphragm type valve 68. Valve portion 60 is located between cylinder 26 and cylinders 44, and more particularly between a back stop 74 and a valve seat 76 adjacent a port 80 of conduit 64.

Valve portion 60 is configured such that during piston actuation the fluid pressure in cylinder 26 can force valve portion 60 against seat 76 to prevent fluid flow from cylinders 44 to cylinder 26 during brake actuation. However, when actuation of piston 30 is terminated and piston 30 starts to return to its unactuated position by spring 36, valve portion 60 moves away from port 80 (due to the now higher pressure in cylinders 44), which permits fluid to return from cylinders 44 to cylinder 26 and causes pistons 48 to retract away from rotor 54.

Depending upon the application, a check valve 79 may be provided in conduit 66 to prevent fluid flow into cylinder 26 from cylinders 44 when actuation is terminated, thus, promoting a continuing fluid recirculation which allows continuous air removal from the system (self-bleeding).

A number of advantages result from the above described valving arrangement. For example, when actuation of piston 30 is terminated, valve 68 (portion 60) will immediately open no matter what movement piston rod 31 has toward its home position. In addition, valve 68 (portion 58) will be allowed to open only as much as the width of cylindrical cavity 94 minus the width of portion 58. Thus, regardless of the home position of piston 30 and the current position of piston 30, the amount of stroke of piston 30 required to close valve portion 58 against port 71 to pressurize the system is the same. As mentioned in the background discussion, this result cannot be achieved in standard master cylinder arrangements because, as the piston is pulled further back, the conventional machined timing ports require further travel to close the port. Another advantage of the present valving arrangement over conventional arrangements is the elimination of stack-up tolerances which typically result from the various components which can affect valve closure (e.g., cups, machine ports, housings, pistons, etc.). With the present embodiment, the only tolerances important in closing valve 68 are the width of cylinder 94 and the width of valve 68.

One skilled in the art will recognize that a wide variety of valving arrangements could be employed in fluid pressurization section 14. For example, valve portions 58 and 60 could be separate, free-floating components, rather than the single annular valve 68 having an interference fit with piston rod 31. As another example, valve portions 58 and 60 could include thickened portions adjacent respective ports 71 and 80, with a thin web connecting the thickened portions. As a further example, a normally open valve arrangement could be provided by securing portions 58 and 60 within cylinder 94 at their peripheries such that each portion is slightly spaced from respective ports 71 and 80. In this case, the natural desire of the rubber to be in its relaxed position (i.e., a position slightly spaced from the ports), would result in ports 71 and 80 being open when the pressure differential is within a predetermined range (e.g., 20 psi). However, when the pressure differential is greater than the predetermined range, valve portions 58 and 60 would distort enough to close off respective ports 71 and 80.

FIG. 2 illustrates one configuration of check valve 79, which is a rectangular cross-section rubber band resting within a rectangular groove 81. Groove 81 extends around a cylindrical porting manifold 83 which includes a portion of the porting shown schematically in FIG. 1. In operation, when fluid is forced by piston 30 through conduit 66 toward cylinders 44, the rubber band lifts away from a fluid outlet port 67 and permits fluid flow. However, fluid is prevented from flowing back into cylinder 26 through conduit 66 because the rubber band is biased against port 67 and fluid flowing back serves to further force the band against port 67.

Turning now to the overall operation of braking system 10, hydraulic fluid is stored in vessel 20, cylinder 26, conduits 62, 64 and 66, and cylinders 44. When piston 30 is moved against the force of spring 36 by the application of appropriate force (e.g. from a cable, electronic actuator or other actuator), the pressure of fluid in cylinder 26 increases to pressurize the fluid in conduits 64 and 66 and cylinders 44. This pressurization causes valves 58 and 60 to close abruptly as discussed above so that substantially all the motion of piston 30 translates into motion of pistons 48. Thus, the valving arrangement substantially reduces the amount piston 30 must move before pistons 48 move to engage pads 50 with brake rotor 54. In other words, the actuation dead-band of pressurization section 14 of system 10 is reduced to near zero.

When the force is removed from piston 30, spring 36 returns piston 30 to its inactivated position. During the return, valves 58 and 60 are no longer forced against respective ports 71 and 80, as described in detail above, such that fluid may return from cylinders 44 to cylinder 26 via conduit 64 and a passage 78 to retract pistons 48 away from rotor 54. Additionally, fluid may move between cylinder 26 and vessel 20 as necessary.

By way of example only, valves 58 and 60 may be fabricated from an elastomer, plastic or a metal, and the valves may be placed substantially at the end of cylinder 26 as shown in FIG. 1. An elastomer is the preferred embodiment. Additionally, fluid outlet port 67 from cylinder 26 to conduit 66 may be placed substantially at the end of cylinder 26 as shown in FIG. 1. However, the placement of the ports from cylinder 26 are considered placed substantially at the end of cylinder 26 if they are not covered by piston 30 while it is moving in its normal range of motion during brake actuation.

Referring again to FIG. 2, a preferred configuration for braking system 10 is illustrated. In this configuration, all or a portion of fluid reservoir 12 (not shown in FIG. 2), fluid pressurization section 14, and brake actuator 16 are fabricated from a single piece housing. In particular, vessel 20, cylinder wall 28 and frame 42 are all cast from the single piece housing. Furthermore, the fluid conduits or passages between vessel 20, cylinder 26 and actuator 16 are formed within the single piece. Actuator 16 and the connecting conduits are arranged and function in generally the same manner as disclosed in Hinkens et al. U.S. Pat. No. 5,390,771, the entire contents of which are incorporated by reference herein. This configuration of the master cylinder and the fixed mount dual piston opposed caliper, all integral, provides a self-contained braking system which can be mounted at the wheel of a bike, motorcycle, car or truck without the need for a master cylinder at another location on the vehicle. Furthermore, piston 30 can be connected directly to a brake cable attached to a brake handle or pedal. The configuration of FIG. 1 allows for preloading of the cable (i.e., removal of slack therein). Additionally, piston 30 can be attached to an electric actuator such as a solenoid or stepping motor arrangement which is electrically coupled to the braking system including the antilock system of the respective vehicle.

In addition to the reduction in the brake actuation dead-band of system 10 as a result of the valving discussed in detail above, the configuration of FIG. 2 further reduces the brake actuation dead-band of system 10 by reducing the length of the fluid conduit between pressurization section 14 and actuator 16. This reduction in length reduces the friction and system expansion losses generated during fluid pressurization in longer fluid conduits.

Figure 3:
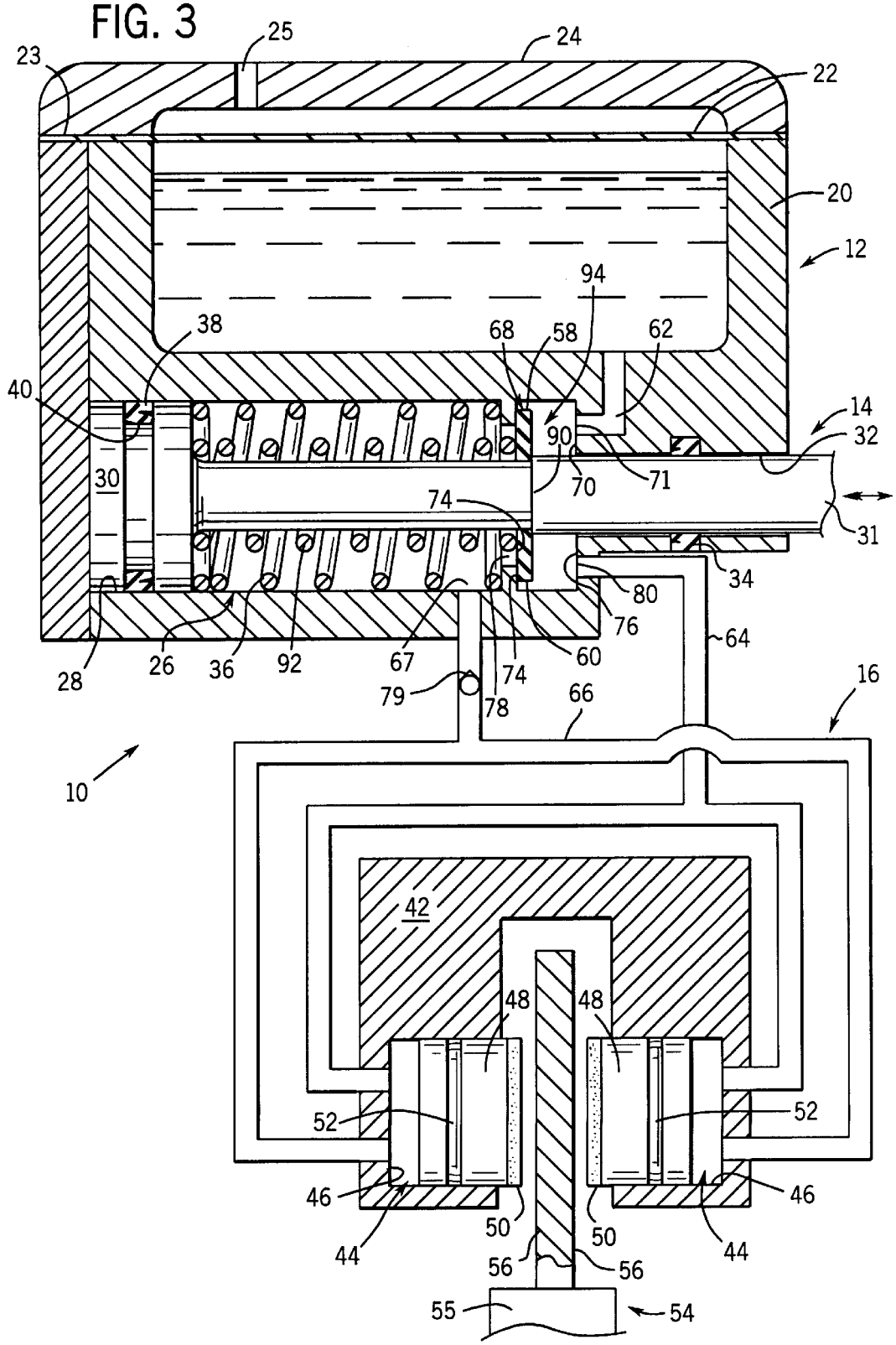
FIG. 3 is a schematic representation of another embodiment of the braking system.

Referring now to FIG. 3, another embodiment of fluid pressurization section 14 is illustrated. In this embodiment, valve seal portions 58 and 60 are formed as a single piece valve 68 which is captured on piston rod 31 between a shoulder 90 and a spring 92. Thus, when piston rod 31 is moved to the right as shown in FIG. 3, spring 92 urges valve 68 (portion 58) to close port 71 to allow fluid pressurization in cylinder 26. Additionally, the cylindrical cavity 94 within which single piece valve 68 is located is wider than the embodiment shown in FIG. 1. This width permits the at-rest position of piston 30 and rod 31 to be varied such that the sensitivity of the braking system can be adjusted. More specifically, if the at-rest position is adjusted to maintain valve 68 (portion 58) relatively far away from port 71, greater motion of piston 30 will be permitted before valve 68 closes port 71 and fluid is forced into cylinders 44, than if the at-rest position is adjusted to maintain valve 68 relatively close to port 71.

By way of example, the width of cavity 94 may be in the range of about 10 to 40 percent of the width of cylinder 26 (i.e. total available travel of piston 30). Preferably, the width is in the range of about 15 to 25 percent, and more preferably at about 20 percent.

Also by way of example, the configuration of pressurization section 14 as shown in FIG. 3 may be advantageously used in motorcycles and bicycles. In bicycles, some users (typically off-road users) desire the ability to adjust brake sensitivity, the amount of brake handle (not shown) motion for braking, and/or brake handle position. Depending upon the application, the brake handle is attached to rod 31 with an appropriate cable (not shown). Referring to FIG. 2, rod 31 is provided with a cable passage 96. The cable extends from an opening 98 through passage 96 to a shoulder 100 against which an adjustment nut engaged with the cable may abut. The location of valve 68 may be adjusted with this nut when the valve configuration of FIG. 3 is incorporated into the one piece configuration of FIG. 2.

The configuration of FIG. 3 permits the user to bring the handle closer to the handle bar before braking when valve 68 is at its at-rest state at locations within cavity 94 relatively far from port 71. The configuration also permits the user to reduce handle motion prior to braking when valve 68 is at its at-rest state at locations within cavity 94 relatively close to port 71.

Referring now to FIG. 4, another embodiment of fluid pressurization section 14 will be described. The description of this embodiment, however, will be generally limited to aspects thereof which differ from the embodiments of fluid pressurization section 14 as described above. The components of braking system 10 not specifically illustrated or described in reference to this embodiment, such as fluid reservoir 12 (not shown in FIG. 4) and brake actuator 16 (not shown in FIG. 4), may be similar to those like components described above. For example, reservoir 12 and actuator 16 may be formed separately and then fluidly coupled to pressurization section 14 by appropriate tubing, or the entire braking system 10 including components 12, 14, 16 and the connecting conduits may be fabricated from a single piece housing (as shown in FIG. 2).

In the embodiment of FIG. 4, valve seal portions 58 and 60 together form valve 68 which is captured on piston rod 31 between shoulder 90 and spring 92. Spring 92 urges valve 68 against shoulder 90 when piston rod 31 is in its at-rest position as shown in FIG. 4. When piston rod 31 is moved to the left as shown in FIG. 4, spring 92 urges valve 68 (portion 58) against valve seat 70 to close port 71, which allows fluid pressurization in cylinder 26.

Similar to the embodiment shown in FIG. 2, the embodiment of FIG. 4 includes a relatively wide cylindrical cavity 94 within which valve 68 is located. As noted above, this extra width (in comparison to the embodiment of FIG. 1) permits the user to custom adjust the sensitivity of the braking system (i.e., change the brake actuation dead-band). In particular, the at-rest position of valve 68 (or more properly, of piston 30 and rod 31) can be set relatively far away from port 71 to decrease brake sensitivity, or moved relatively close to port 71 to increase brake sensitivity.

As illustrated in FIG. 4, the brake handle (not shown) is attached to piston rod 31 with an appropriate cable 97. More specifically, cable 97 extends from the brake handle through a protective cable covering 95 and through a cable passage 96 in rod 31 to a shoulder 100. Cable 97 is releasably secured against shoulder 100 by a set screw 99. The at-rest position of valve 68 may be adjusted to change the brake sensitivity by means of set screw 99 or by means of a separate cable adjustment (not shown) which is typically provided on the brake handle of off-road bikes. Typically, the set screw 99 cable adjustment is used to initially set the brake sensitivity and to make coarse adjustments, and the brake handle adjustment is used to fine-tune the brake sensitivity when, for example, pads 50 begin to wear or the riding conditions change.

As illustrated in FIG. 4, the embodiment thereof differs from the above-described embodiments in several other respects. For example, the concentric arrangement of piston spring 36 (the inner spring) and valve spring 92 (the outer spring), is exactly opposite the concentric arrangement of piston spring 92 (the inner spring) and valve spring 36 (the outer spring) in the embodiment of FIG. 3. Other differences are that piston spring 36 in the embodiment of FIG. 4 extends substantially the entire length of fluid pressurization section 14, and that a portion of piston spring 36 extends through cable passage 96 of piston rod 31 rather than around the outer circumference of rod 31.

Other differences in the embodiment of FIG. 4 relate to the seal and conduit arrangements. Unlike the embodiments of FIGS. 1 and 3, both seals 34 and 38 move with rod 31, rather than only seal 38. Also unlike the embodiments of FIGS. 1 and 3, the embodiment of FIG. 4 includes two ports 67', 67" (schematically illustrated) leading to two conduits 66', 66" (not shown in FIG. 4), both of which provide for the passage of fluid flow to and from cylinders 46, i.e., neither conduit includes a check valve function. Thus, the two conduits 66', 66" are parallel conduits which provide the same function. The reason for two bi-directional conduits 66', 66" rather than one is to ensure sufficient fluid flow between cylinder 26 and cylinders 44 irrespective of the position of valve 68 (portion 60). That is, although valve 68 (portion 60) may at times partially restrict the fluid flow to one of the two ports 67', 67", at least one of the two ports will be unrestricted at any given moment because the width of valve 68 (portion 60) is less than the spacing between the two ports 67', 67".

Figure 5:
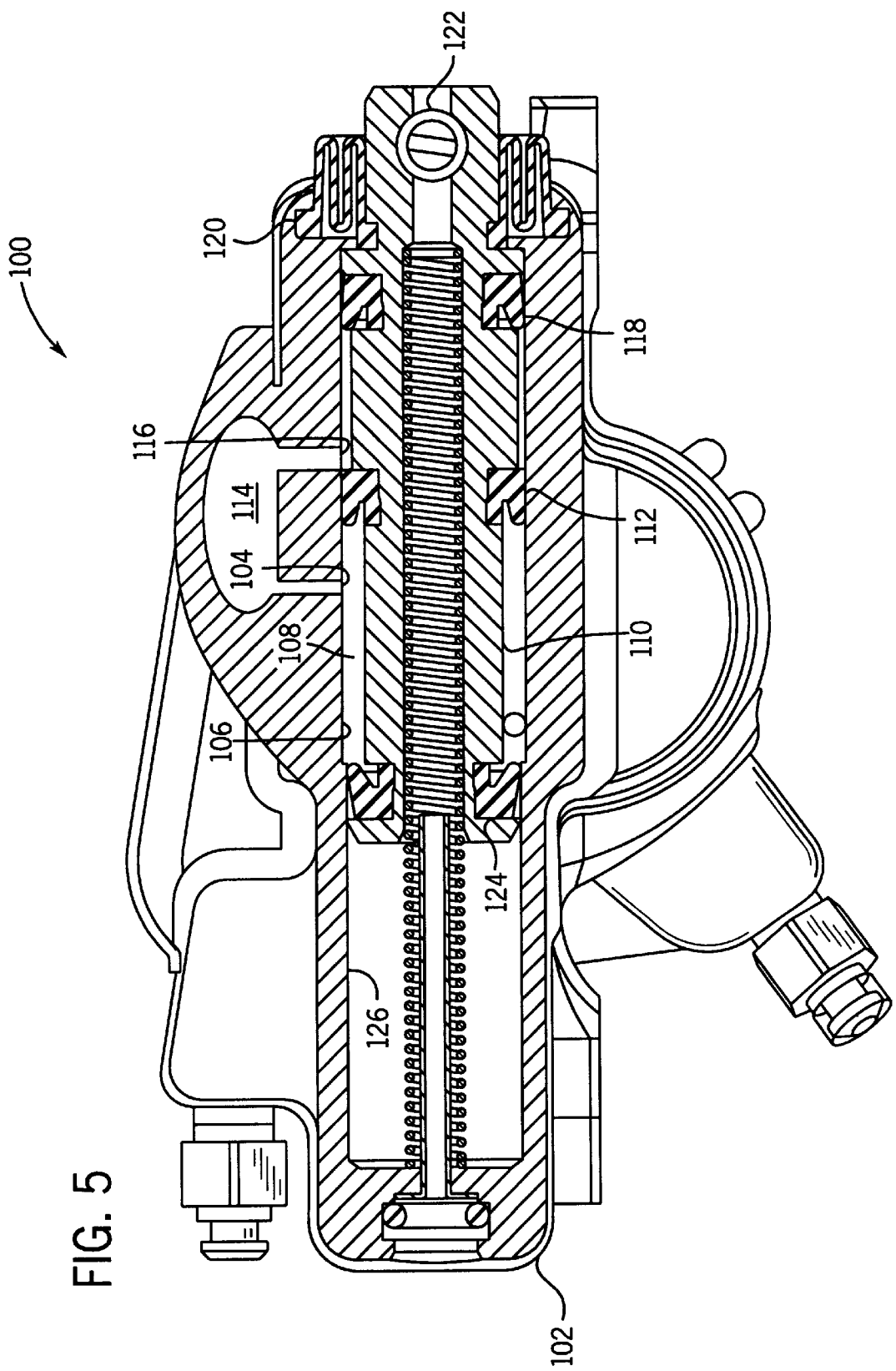
FIG. 5 is a partially schematic representation of another embodiment of a braking arrangement including a more conventional pressurization section adapted in accordance with principles of the present invention.

Referring now to FIG. 5, another embodiment of a braking arrangement 100 including a fluid pressurization section 102 will be described. Pressurization section 102 is of a more conventional type than the preferred embodiments described above and illustrated in FIGS. 1–4 in a number of respects. In particular, pressurization section 102 employs a fixed timing port 104 that is machined into a cylinder wall 106 for defining a pressure chamber 108 within the system, rather than employing movable flapper type valves as in the above embodiments.

More specifically, fluid pressurization section 102 includes a conventional style piston 110 having a primary cup 112, which when urged forward will close timing port 104. Timing port 104 is a relatively small port in fluid communication with a reservoir 114 and, when closed, defines pressure chamber 108. A compensating port 116 is preferably provided behind primary cup 112. Compensating port 116 is a relatively large port which helps compensate for fluid that is used in the system rapidly, i.e., it avails reservoir fluid to the annulus behind primary cup 112 to allow rapid pump-up across primary cup 112 on a return stroke. A secondary cup 118 moves forward with piston 110, but not so far as to cross compensating port 116. Otherwise, there would be potential for leakage.

With this arrangement, primary cup 112 can be adjusted away from timing port 104, such as between 0.200 inches and 0.002 inches from timing port 104. Thus, the distance to close timing port 104 and define pressure chamber 108 is variable. In FIG. 5, piston 110 is illustrated in an rest position up against a boot 120, at which position a large deadband is provided before timing closure. The deadband can be adjusted out by the user with the thumb screw adjuster typically provided on the hand lever adjuster of most mountain bikes.

As one skilled in the art will recognized, the illustrated embodiment differs from standard master cylinder arrangements in that a cable (not shown) comes all the way through it and is pinched in a clenching device 122 on the end of piston 110. Because of this arrangement, there is a third cup (or seal) 124 which is located forward of primary cup 112 and which moves with piston 110. However, third cup 124 rides in a smaller diameter bore 126 so that with stroke the system pressure is built up by the differential area between bore 126 and pressure chamber 108.

While particular embodiments and certain modifications to and uses of the embodiments of the present invention have been shown and described herein, other modifications and uses may become apparent. Such modifications and uses may be made without departing from the spirit or scope of the invention. For example, many vehicles include hydraulically operated clutches which control the transmission of power from a motor or engine to a drive train. It is contemplated that the fluid pressurization and valving arrangements disclosed herein could be used for pressurizing hydraulic actuators for clutches.

What is claimed is:

1. A hydraulic fluid pressurization system comprising:
    a fluid reservoir;
    a housing defining a cylinder including a first end and a second end, the housing including a valve seat adjacent a reservoir port located generally at the second end of the cylinder and in fluid communication with the reservoir;
    a piston moveable within the cylinder between the first and second ends; and
    a free-floating first valve disposed between the reservoir and the cylinder to prevent fluid flow from the cylinder to the reservoir when the piston is moved to pressurize fluid in the cylinder, the first valve moving against the valve seat to close the reservoir port in response to movement of the piston; and a fluid return port located generally at the second end of the cylinder configured to communicate with a brake actuator.

2. The system of claim 1, wherein the first valve is disposed within a cylindrical cavity located between the reservoir and the cylinder.

3. The system of claim 1, wherein the first valve moves in response to a pressure differential caused by movement of fluid into the reservoir port.

4. A hydraulic fluid pressurization system comprising:
    a fluid reservoir;
    a housing defining a cylinder including a first end and a second end, the housing including a valve seat adjacent a reservoir port located generally at the second end of the cylinder and in fluid communication with the reservoir;
    a piston moveable within the cylinder between the first and second ends; and
    a first valve disposed between the reservoir and the cylinder to prevent fluid flow from the cylinder to the reservoir when the piston is moved to pressurize fluid in the cylinder, the first valve moving against the valve seat to close the reservoir port in response to movement of the piston;
    an outlet port located generally at the second end of the cylinder configured to supply fluid from the cylinder to a brake actuator; and
    a fluid return port located generally at the second end of the cylinder configured to return fluid from the brake actuator to the cylinder.

5. The system of claim 4, further comprising a conduit connected between the reservoir and the reservoir port to provide the fluid communication therebetween.

6. The system of claim 5, wherein the first valve is located substantially at the reservoir port.

7. The system of claim 4, wherein the reservoir and cylinder are integrally formed from a common housing and the housing includes a passage connected between the reservoir and the reservoir port to provide the fluid communication therebetween.

8. A braking system with a user controllable dead zone, the braking system comprising:
    a fluid reservoir;
    a cylinder including a reservoir port;
    a piston disposed in the cylinder, the piston having a user selectable first position for when the system is not braking;
    a rod fixedly connected to the piston to actuate the braking system when force is applied to the rod;
    a first spring configured to return the piston to the user selectable first position when force is removed from the rod;
    a first fluid channel connecting the reservoir to the reservoir port;
    a brake actuator;
    a second fluid channel connecting the cylinder to the brake actuator, the piston being moveable within the cylinder to produce fluid flow in the first channel; and
    a first valve disposed between the reservoir and the cylinder to prevent fluid flow from the cylinder to the reservoir when the piston is moved to pressurize fluid in the second fluid channel, the first valve urged against a shoulder on the rod to close the reservoir port when the rod is moved to a predetermined second position, the distance between the user selectable first position and the second position comprising the user controllable dead zone.

9. The braking system of claim 8, further including a user adjustable set screw disposed to secure the piston in the selectable first position.

10. The braking system of claim 8, wherein the first valve is urged against the shoulder by a second spring.

11. The braking system of claim 10, wherein the first spring is concentric with and disposed within the second spring.

12. The braking system of claim 8 comprising in addition a third channel between the cylinder and the brake actuator to return fluid from the brake actuator to the cylinder.

13. The braking system of claim 8 comprising in addition a check valve disposed in the second fluid channel to prevent reverse flow of fluid from the brake actuator to the cylinder.

14. The braking system of claim 8 wherein the brake actuator is a disk brake system.

15. The braking system of claim 8 wherein the brake actuator comprises:
- a piston connected to the cylinder and receiving fluid from the cylinder; and
- a brake pad connected to the piston and adapted to be moved into braking contact with a disk to brake the disk.

16. A braking system comprising:
- a source of brake fluid;
- a cylinder connected to the source of brake fluid;
- a piston disposed in the cylinder;
- a rod connected to the piston to move the piston;
- a shoulder on the rod;
- a brake actuator connected to the cylinder to receive brake fluid from the cylinder and return brake fluid to the cylinder;
- a first spring returning the piston to a first predetermined position;
- a valve closing a connection between the cylinder and the source of brake fluid; and
- a second spring disposed between the piston and the valve to hold the valve against the shoulder to move the valve into a closed position when the rod is moved and to maintain a force on the valve when the piston is moved a predetermined distance.

17. The braking system of claim 16 wherein the source of brake fluid is a reservoir.

18. The braking system of claim 16 wherein the reservoir is vented to the atmosphere.

19. The braking system of claim 16 wherein the cylinder is connected to the source of brake fluid by a fluid channel.

20. The braking system of claim 16 wherein the brake actuator is a disk brake caliper.

21. The braking system of claim 16 wherein the brake actuator is a drum brake.

22. The braking system of claim 16 wherein the rod is sealed against leakage of fluid by a gasket.

23. The braking system of claim 16 wherein the valve is a flap valve.

24. The braking system of claim 16 wherein the valve in the closed position prevents return of brake fluid to the cylinder.

25. The braking system of claim 16 wherein the first and second springs are concentric and the first spring is inside the second spring.

26. The braking system of claim 16 wherein the first and second springs are concentric and the first spring is outside the second spring.

27. A hydraulic fluid pressurization system comprising:
- a fluid reservoir;
- a housing defining a cylinder including a first end and a second end, the housing including a reservoir port located generally at the second end of the cylinder and in fluid communication with the reservoir;
- a piston moveable within the cylinder between the first and second ends;
- a rod fixedly connected to the piston to actuate the pressurization system when force is applied to the rod; and
- a first valve mounted on the piston rod and disposed between the reservoir and the cylinder to prevent fluid flow from the cylinder to the reservoir when the piston is moved to pressurize fluid in the cylinder, the first valve moving relative to the reservoir port in response to movement of the piston.

28. The system of claim 27, wherein the first valve is urged against a shoulder on the piston rod by a spring.

29. The system of claim 27, wherein the piston has a user selectable first position for when the system is not pressurized, and wherein the first valve closes the reservoir port when the rod is moved to a predetermined second position, the distance between the first and second positions providing a user controllable dead zone.

* * * * *